US007953686B2

(12) United States Patent  (10) Patent No.: US 7,953,686 B2
Angell et al.  (45) Date of Patent: May 31, 2011

(54) SENSOR AND ACTUATOR BASED VALIDATION OF EXPECTED COHORT BEHAVIOR

(75) Inventors: Robert Lee Angell, Salt Lake City, UT (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 12/049,725

(22) Filed: Mar. 17, 2008

(65) Prior Publication Data

US 2009/0234810 A1  Sep. 17, 2009

(51) Int. Cl.
*G06F 17/00*  (2006.01)
*G06N 5/00*  (2006.01)

(52) U.S. Cl. ....................................................... 706/45
(58) Field of Classification Search .................. 706/45
See application file for complete search history.

(56) References Cited

U.S. PATENT DOCUMENTS 7,623,823 B2 * 11/2009 Zito et al. ...................... 455/2.01
7,870,085 B2 *  1/2011 Angell et al. .................... 706/45

OTHER PUBLICATIONS

Cohort selection and word grammar effects for speaker recognition, Colombi, J.M.; Ruck, D.W.; Anderson, T.R.; Rogers, S.k.; Oxley, M.; Accoustics, Speech, and Signal Processing, 1996. ICASSP-96. Conference Proceedings., 1996 IEEE International Conference on vol. 1 Digital Object Identifier: 10.1109/ICASSP.1996.540296 , pp. 85-88 vol. 1.*
Improving generalizing capability of connectionist model through emergent dynamic behavior, Wang Hong-Qi; Chen Zong-Zhi; Su Shi-Wei; Neural Networks, 1992. IJCNN., International Joint Conference on vol. 1 Digital Object Identifier: 10.1109/IJCNN.1992. 287186 Publication Year: 1992, pp. 353-358 vol. 1.*
Syntactic heads in statistical language modeling, Jun Wu; Khudanpur, S.; Acoustics, Speech, and Signal Processing, 2000. ICASSP'00. Proceedings. 2000 IEEE International Conference on vol. 3 Digital Object Identifier: 10.1109/ICASSP.2000.862078 Publication Year:2000 , pp. 1699-1702 vol. 3.*
Prediction of prosodic phrase boundaries considering variable speaking rate, Yeon-Jun Kim; Yung-Hwan Oh; Spoken Language, 1996. ICSLP 96. Proceedings., Fourth International Conference on vol. 3 Digital Object Identifier: 10.1109/ICSLP.1996.607902 Publication Year: 1996 , pp. 1505-1508 vol. 3.*
U.S. Appl. No. 12/050,537, filed Mar. 18, 2008, Angell et al.
U.S. Appl. No. 12/050,720, filed Mar. 18, 2008, Angell et al.
Brown et al., "IBM Smart Surveillance System (S3): An open and extensible architecture for smart video surveillance", pp. 1-4. http://research.microsoft.com/iccv2005/demo/ibm_s3/ibms3_iccv05demo.pdf.

* cited by examiner

*Primary Examiner* — Michael Holmes
(74) *Attorney, Agent, or Firm* — Yee & Associates, P.C.; John R. Pivnichny

(57) ABSTRACT

A computer implemented method, apparatus, and computer-usable program product for validating expected cohort behavior. In one embodiment, sensory data gathered by a set of multimodal sensor devices is processed to form a set of actual cohort behavior data. The sensory data comprises information associated with a cohort group. Each member of the cohort group shares at least one common attribute. The set of actual cohort behavior data is compared to a set of predicted cohort behavior models. The set of actual cohort behavior data comprises information describing actual behavior by members of the cohort group. The set of predicted cohort behavior models comprises information describing an expected behavior of members of the cohort group. A comparison result is generated. The comparison result indicates an accuracy of the set of predicted cohort behavior models.

25 Claims, 6 Drawing Sheets

SENSOR AND ACTUATOR BASED VALIDATION OF EXPECTED COHORT BEHAVIOR

BACKGROUND OF THE INVENTION

1. Field of the Invention

The present invention is related generally to an improved data processing system, and in particular to a method and apparatus for processing multimodal sensor data. More particularly, the present invention is directed to a computer implemented method, apparatus, and computer usable program code for validating expected cohort behavior using sensory data gathered by multimodal sensor devices.

2. Background Description

A cohort is a group of people or objects that share a common characteristic or experience. For example, a group of people born in 1980 may form a birth cohort. A cohort may include one or more sub-cohorts. Another example, the birth cohort of people born in 1980 may include a sub-cohort of people born in 1980 in Salt Lake City, Utah. A sub-subcohort may include people born in 1980 in Salt Lake City, Utah to low income, single parent households.

A cohort study is typically a longitudinal study that monitors or tracks cohort groups over time to identify trends, rates of disease in the cohorts, cohort behavior, and/or other factors, events, and behaviors associated with the members of the cohort group. Future cohort behavior may be predicted using cohort models to determine probable behaviors of cohorts in a given environment. The accuracy of the predicted cohort models may be important to both long-term and short-term cohort studies.

BRIEF SUMMARY OF THE INVENTION

According to one embodiment of the present invention, a computer implemented method, apparatus, and computer-usable program code is provided for validating expected cohort behavior. Sensory data associated with a cohort group is processed to form a set of actual cohort behavior data. Each member of the cohort group shares at least one common attribute. The set of actual cohort behavior data is compared to a set of predicted cohort behavior models. The set of actual cohort behavior data comprises information describing actual behavior by members of the cohort group. The set of predicted cohort behavior models comprises information describing an expected behavior of members of the cohort group. A comparison result is generated. The comparison result indicates an accuracy of the set of predicted cohort behavior models.

DETAILED DESCRIPTION OF THE INVENTION

Figure 1:
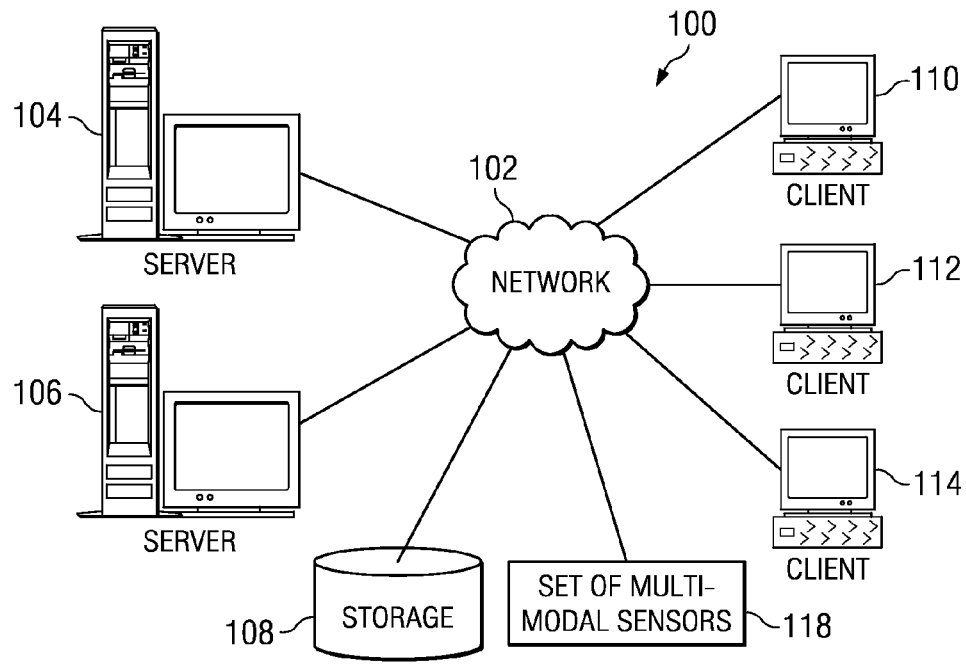
FIG. 1 is a block diagram of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
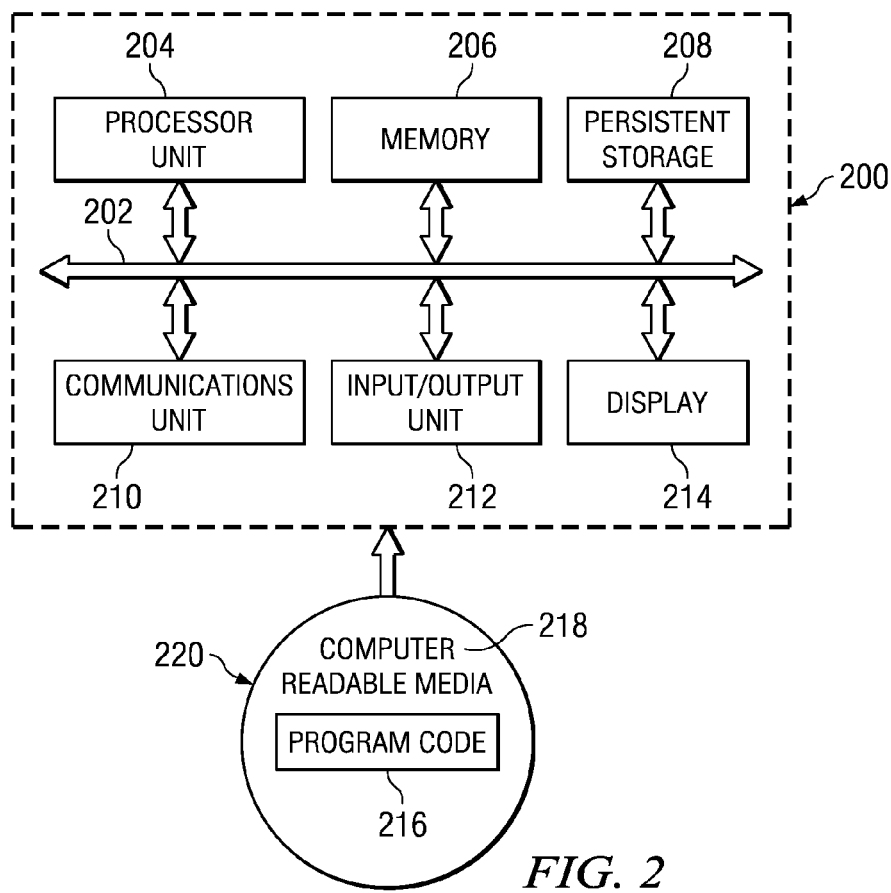
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

Set of multimodal sensors 118 is a set of one or more multimodal sensor devices for gathering information associated with one or more members of a cohort group. A multimodal sensor is an actuator and/or sensor capable of generating sensor data and transmitting the sensor data to a central data processing system, such as data processing system 100 in FIG. 1. Set of multimodal sensors 118 may include, without limitation, one or more global positioning satellite receivers, infrared sensors, microphones, motion detectors, chemical sensors, biometric sensors, pressure sensors, temperature sensors, metal detectors, radar detectors, photosensors, seismographs, anemometers, or any other device for gathering information describing at least one member of a cohort. A multimodal sensor includes a transmission device for communicating the information describing members of cohort groups with one or more other multimodal sensors and/or data processing system 100.

The transmission device may be implemented as any type of device for permitting the exchange of information between multimodal sensors and/or data processing system 100. For example, and without limitation, the transmission device may include a wireless personal area network (PAN), a wireless network connection, a radio transmitter, a cellular telephone signal transmitter, or any other wired or wireless device for transmitting data between multimodal sensors and/or data processing system 100. A wireless personal area network may include, but is not limited to, Bluetooth technologies. A wireless network connection may include, but is not limited to, Wi-Fi wireless technology.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). In addition, data processing system 100 may optionally be implemented as a data processing system in a grid computing system and/or any other type of distributed data processing system.

FIG. 1 is intended as an example, and not as an architectural limitation for the different illustrative embodiments. Network data processing system 100 may include additional servers, clients, sensors, and other devices not shown.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, compute-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The accuracy of predicted models of behavior may be important to both long term and short term cohort studies. If a predicted model of behavior is inaccurate, the cohort studies relying on those unreliable or inaccurate predicted cohort behavior models may result in inaccurate findings, wasted time, and resources spent on the study, and possibly result in a total loss of the study due to the inaccuracies in the predicted behavior models. The illustrative embodiments recognize that sensors and actuator technology may be used as input devices to a data processing system, such as data processing system 100 in FIG. 1, to validate expected cohort group behavior from predicted cohort models with actual behavior of the cohort group to optimize a given environment. Therefore, one embodiment provides a computer implemented method, apparatus, and computer-usable program product for validating expected cohort behavior.

Sensory data associated with a cohort group is processed to form a set of actual cohort behavior data. Each member of the cohort group shares at least one common attribute. The sensory data is gathered by a set of multimodal sensors. The set of actual cohort behavior data comprises information describing actual behavior by members of the cohort group. The set of actual cohort behavior data is compared to a set of predicted cohort behavior models. The set of predicted cohort behavior models comprises information describing an expected behavior of members of the cohort group. In one embodiment, comparing the set of actual cohort behavior data to the set of predicted cohort behavior models comprises identifying a predicted cohort behavior model associated with the cohort group and parsing the predicted cohort behavior model to identify expected behaviors associated with the members of the cohort group. The actual behaviors associated with members of the cohort group are compared to the expected behaviors. In response to a correlation between the actual behaviors and the expected behaviors, a number of occurrences of the actual behaviors corresponding to a given expected behavior are identified.

The cohort data is collected from the multimodal sensor devices from a single or multiple stations/locations and is stored centrally or de-centrally. This data is collected parsed, categorized, and appropriately processed. The data is then analyzed and compared to predicted cohort models. This provides real-time, iterative feedback to cohort models in use for a given environment.

A comparison result is then generated. The comparison result indicates an accuracy of the set of predicted cohort behavior models. The comparison result may indicate the accuracy of only a single predicted cohort behavior model. In this embodiment, the comparison result indicates a number of times a given expected behavior in a single predicted cohort data model corresponds with a given actual behavior of at least one member of the cohort group and/or indicates a rate of occurrence of each expected behavior in a single predicted cohort data model that corresponds with an actual behavior of at least one member of the cohort group.

The cohort behavior comparison using multimodal sensory data provides actual versus theoretical feedback for a given situation. Using the sensors and actuator technology as input devices to validate cohort behavior with predicted cohort models to optimize a given environment.

In another embodiment, the comparison result indicates the accuracy of two or more different predicted cohort behavior models in the set of predicted cohort behavior models. In this embodiment, the comparison result indicates a number of times each expected behavior corresponds with the actual behavior of the members of a set of cohort groups.

In one embodiment, processing the sensory data comprises collecting the sensory data from a plurality of sensors in a set of multimodal sensors to form aggregated sensory data. The sensory data from the set of multimodal sensors is parsed to form events. Each event is an event associated with a behavior of a cohort. For example, an event may include, without limitation, a cohort wearing a pink baseball cap. Another event may include a cohort walking a dog at a particular time of day. The events are categorized in accordance with a type of the event. The events are processed to identify actual behaviors associated with members of cohort groups to form the set of actual cohort behavior data.

In yet another embodiment, the set of multimodal sensors includes a set of cameras. The set of cameras may be digital video cameras or any other type of image capture device. The set of digital video cameras captures a stream of video data associated with the cohort group. The stream of video data is transmitted to a central data processing system, such as data processing system 100 in FIG. 1 or data processing system 200 in FIG. 2. The video data is transmitted to the data processing system in real time as the stream of video data is generated. The stream of video data is processed by a video analytics engine associated with the central data processing system to generate video metadata describing the members of the cohort group and objects in the stream of video data. Actual behaviors of the members of the cohort group are identified using the video metadata.

In another embodiment, the set of multimodal sensors comprises a set of radio frequency identification tag readers. The set of radio frequency identification tag readers receives information from radio frequency identification tags.

Figure 3:
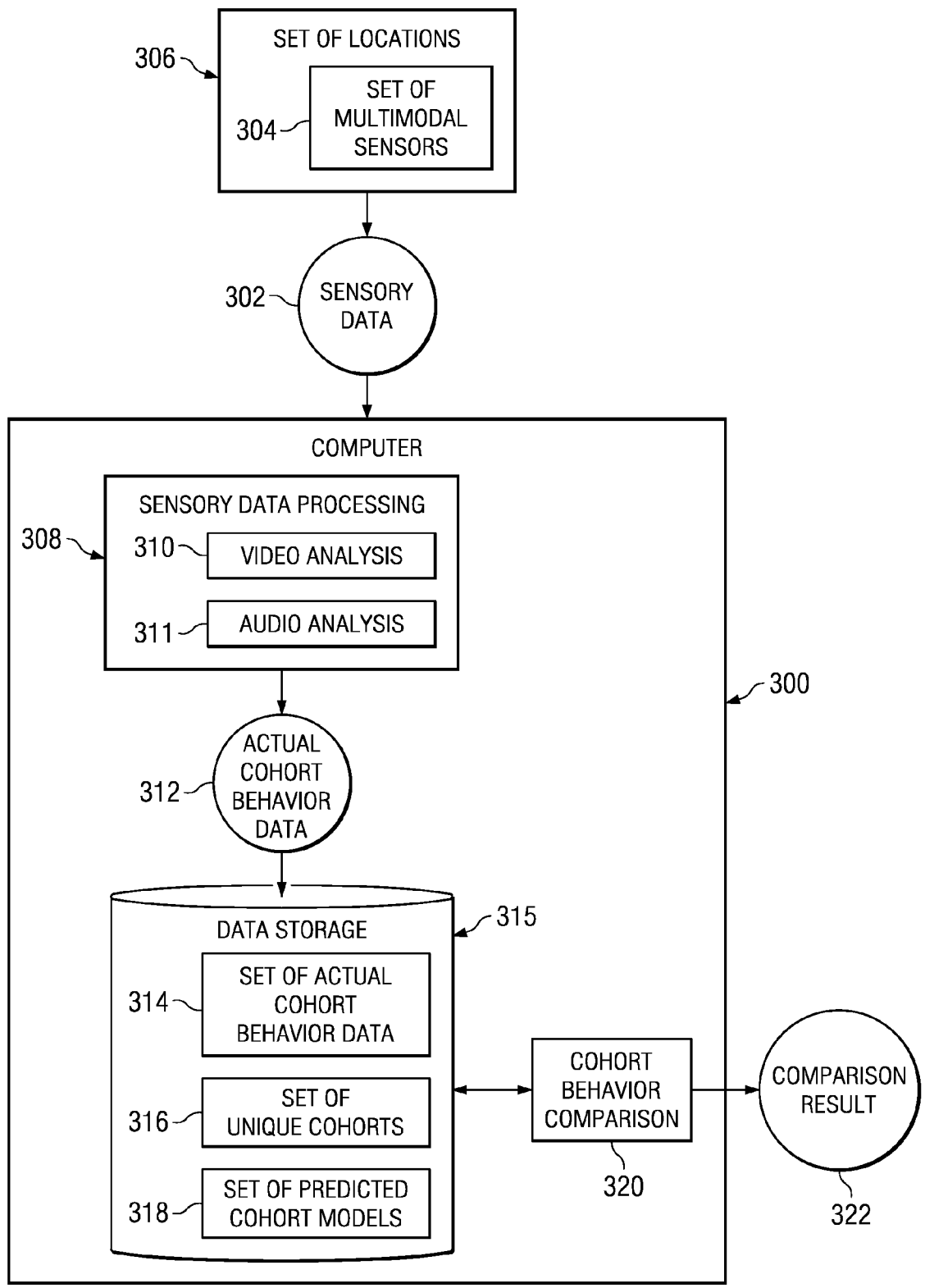
FIG. 3 is a block diagram of a system for validating expected cohort behavior in accordance with an illustrative embodiment.

FIG. 3 is a block diagram of a system for validating expected cohort behavior in accordance with an illustrative embodiment. Computer 300 may be implemented using any type of computing device, such as a personal computer, laptop, personal digital assistant, or any other computing device depicted in FIGS. 1 and 2. Computer 300 receives sensory data 302 from set of multimodal sensors 304. Sensory data 302 is sensor data associated with one or more members of a cohort group. A cohort group is a group of people or objects having one or more characteristics or experiences in common.

Set of multimodal sensors 304 is a set of one or more sensors and/or actuators, such as set of multimodal sensors 118 in FIG. 1. Set of multimodal sensors 304 includes sensors having different modes, such as, without limitation, microphone sensors for gathering audio sensor data, cameras for gathering video data, radio frequency identification tag readers for detecting radio frequency signals emitted by radio frequency identification tags, and/or any other type of sensor in a plurality of available multimodal sensors.

Set of multimodal sensors 304 is located in a set of locations 306. Set of locations 306 is a set of one or more locations. Set of locations 306 may include indoor locations, outdoor locations, and/or a combination of indoor and outdoor locations. For example, and without limitation, set of locations 306 may include public locations, such as sidewalks, public parking areas, recreation areas, and parks. Set of locations 306 may also include privately owned areas, such as retail stores, amusement parks, privately owned parking lots, and/or other areas.

Sensory data processing 308 is a software component for processing sensory data 302 to form a set of actual cohort behavior data. Sensory data processing 308 collects sensory data from the sensors and actuators in set of multimodal sensors 304 to form aggregated sensory data. Sensory data processing 308 parses the sensory data to form events.

In this embodiment, sensory data processing 308 comprises video analysis 310. Video analysis 310 is a software component for performing digital video analysis. If set of multimodal sensors 302 includes a set of digital video cameras, the set of digital video cameras captures a stream of video data associated with the cohort group. In other words, the digital video cameras generate images of one or more members of the cohort group. The images are included in the stream of video data. The set of video cameras transmits the stream of video data to sensory data processing 308 in real time as the stream of video data is generated. In another embodiment, the stream of video data is sent to a data storage device. The video data is then retrieved by sensory data processing 308 for analysis at a later time, rather than receiving the video data in real time.

Video analysis 310 analyzes the stream of video data using video analytics to generate video metadata describing the members of the cohort group and objects in the stream of video data. Likewise, audio analysis 311 is a software analytics engine for analyzing audio data captured by one or more microphones and/or video cameras. Audio analysis 311 generates metadata describing the contents of the audio data received from set of multimodal sensors 304. Sensory data processing 308 identifies events associated with actual behaviors of the members of the cohort group using the video metadata and/or audio metadata.

Sensory data processing 308 categorizes the events in accordance with a type of the event. For example, a type of event may include a pace of walking, a companion of the cohort, a time of day a cohort eats a meal, a brand of soda purchased by the cohort, a pet purchased by the cohort, a type of medication taken by the cohort, or any other event.

Sensory data processing 308 processes the events to identify actual behaviors associated with members of cohort groups to form the set of actual cohort behavior data 312. Actual cohort behavior data 312 is data describing actual behaviors of one or more members of a cohort group identified based on an analysis of sensory data 302. Computer 300 may store sensory data 302 as set of actual cohort data 314 in data storage 315. Set of actual cohort behavior data 314 comprises information describing actual behavior by members of the cohort group.

Data storage 315 may be implemented as any type of device for storing data, such as, without limitation, a hard drive, a flash memory, a main memory, read only memory (ROM), a random access memory (RAM), or any other type of data storage device. Data storage may be implemented in a single data storage device or a plurality of data storage devices. Data storage 315 may be a data storage device that is local to computer 300 or a device located remotely to computer 300. If data storage 315 comprises one or more remote data storage device, the remote data storage devices are accessed via a network connection, such as network 102 in FIG. 1. Data storage may be a central data storage or a decentralized data storage, such as, without limitation, a grid data processing system, a federated database, and/or any other type of distributed data storage device.

Set of unique cohorts 316 is information describing the members of one or more unique cohort groups. The cohort groups in set of unique cohorts 316 may include sub-cohort and sub-sub-cohort groups. The cohort groups may include one or more members in each cohort group. The cohort groups may be any type of cohorts, such as, without limitation, birth cohorts, occupations cohorts, medical treatment cohorts, customer cohorts, pedestrian cohorts, pet owner cohorts, or any other type of cohorts. The cohort groups may include humans, animals, plants, or objects. For example, set of unique cohorts 316 could include a plant cohort that includes a sub-cohort of trees and a sub-cohort of flowers. Another cohort group may include a cohort of pick-up trucks.

Set of predicted cohort models 318 is a set of one or more models of expected cohort behavior. In other words, set of predicted cohort models 318 comprises information describing expected behaviors by one or more members of a cohort group. Set of predicted cohort models 318 are pre-generated cohort behavior prediction models. Set of predicted cohort models 318 may be generated in accordance with any known or available technique for generating predicted cohort behavior models.

Cohort behavior comparison 320 is a software component that compares set of actual cohort behavior data 314 to set of predicted cohort models 318. Cohort behavior comparison 320 identifies a predicted cohort behavior model in set of unique cohorts 316. Cohort behavior comparison 320 parses the predicted cohort behavior model to identify expected behaviors associated with the members of the cohort group. Cohort behavior comparison 320 compares the actual behaviors in set of actual cohort behavior 314 associated with members of the cohort group to the expected behaviors. In response to a correlation between the actual behaviors and the expected behaviors, cohort behavior comparison 320 identifies a number of occurrences of the actual behaviors corresponding to a given expected behavior. The cohort behavior comparison component generates comparison result 322.

Comparison result 322 indicates an accuracy of the set of predicted cohort behavior models. Comparison result indicates an accuracy of a given predicted cohort behavior model in set of predicted cohort models 318. Comparison result 322 may indicate a number of times a given expected behavior in a single predicted cohort data model occurs that correspond with a given actual behavior of a cohort member. Comparison result 322 may also indicate a rate of occurrence of each actual behavior in set of actual cohort behavior data 314 that corresponded to an expected behavior in set of predicted cohort models 318.

In another embodiment, comparison result 322 indicates a number of times each expected behavior in set of predicted cohort models 318 corresponds with the actual behavior of the members of set of unique cohorts 316 in set of actual cohort behavior data 314.

Figure 4:
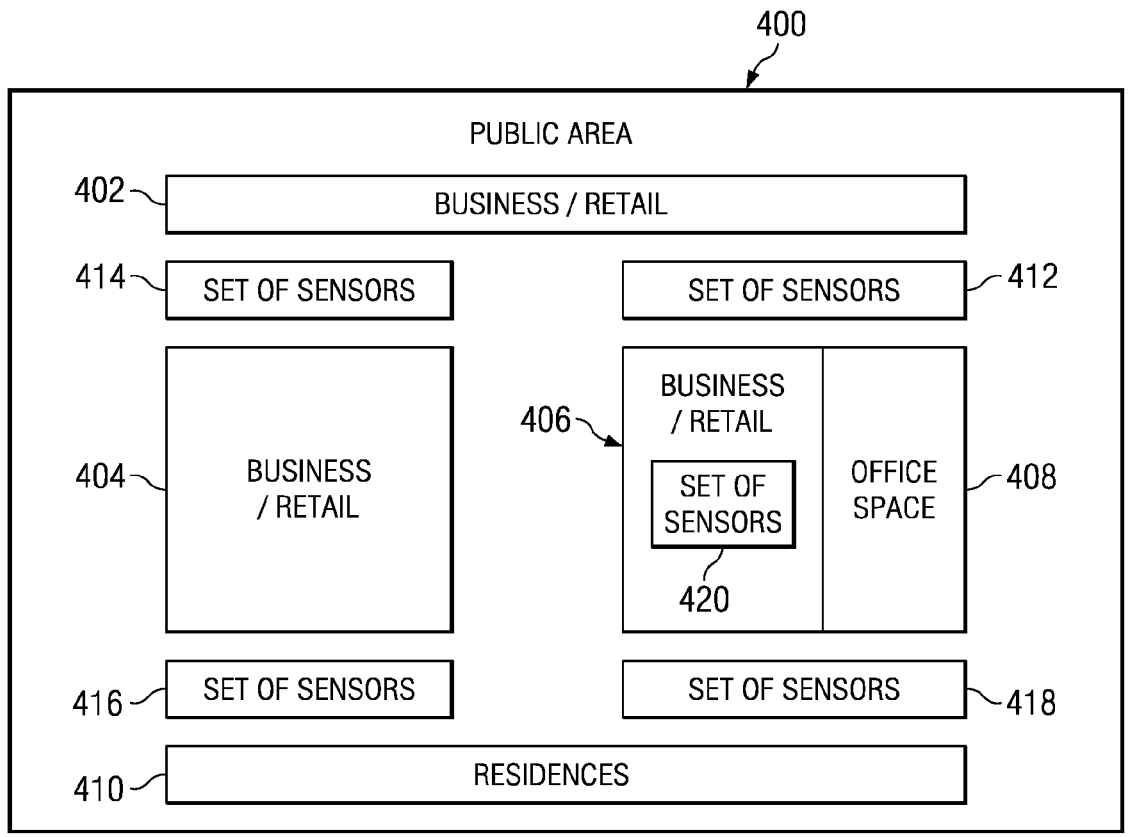
FIG. 4 is a block diagram of a set of multimodal sensors located in a plurality of locations in accordance with an illustrative embodiment.

Turning now to FIG. 4, a block diagram of a set of multimodal sensors located in a plurality of locations is depicted in accordance with an illustrative embodiment. Public area 400 is an area that is open to the public and/or publicly owned rather than privately owned. Business/retail 402-406 are commercial retail establishments, such as a department store, grocery store, clothing store, or any other type of business or retail establishment. Residences 410 are residences, such as single family homes, apartments, condominiums, duplexes, or other types of residences.

Set of sensors 412-420 are sets of multimodal sensors, such as set of multimodal sensors 118 in FIG. 1. Set of sensors 412-420 may be located in any public and/or privately owned locations. In this example, set of sensors 412-418 are located in public area 400. Set of sensors 420 is located in business/retail 406. Thus, in this example, set of sensors 412-420 are located in a combination of public and privately owned spaces. However, set of sensors 412-420 may also be located entirely in public area 400. In another embodiment, set of sensors 412-420 are located in two or more different business/retail establishments, such as business/retail 402-406. Sensors may also optionally be included in office space 408 and/or residences 410.

Figure 5:
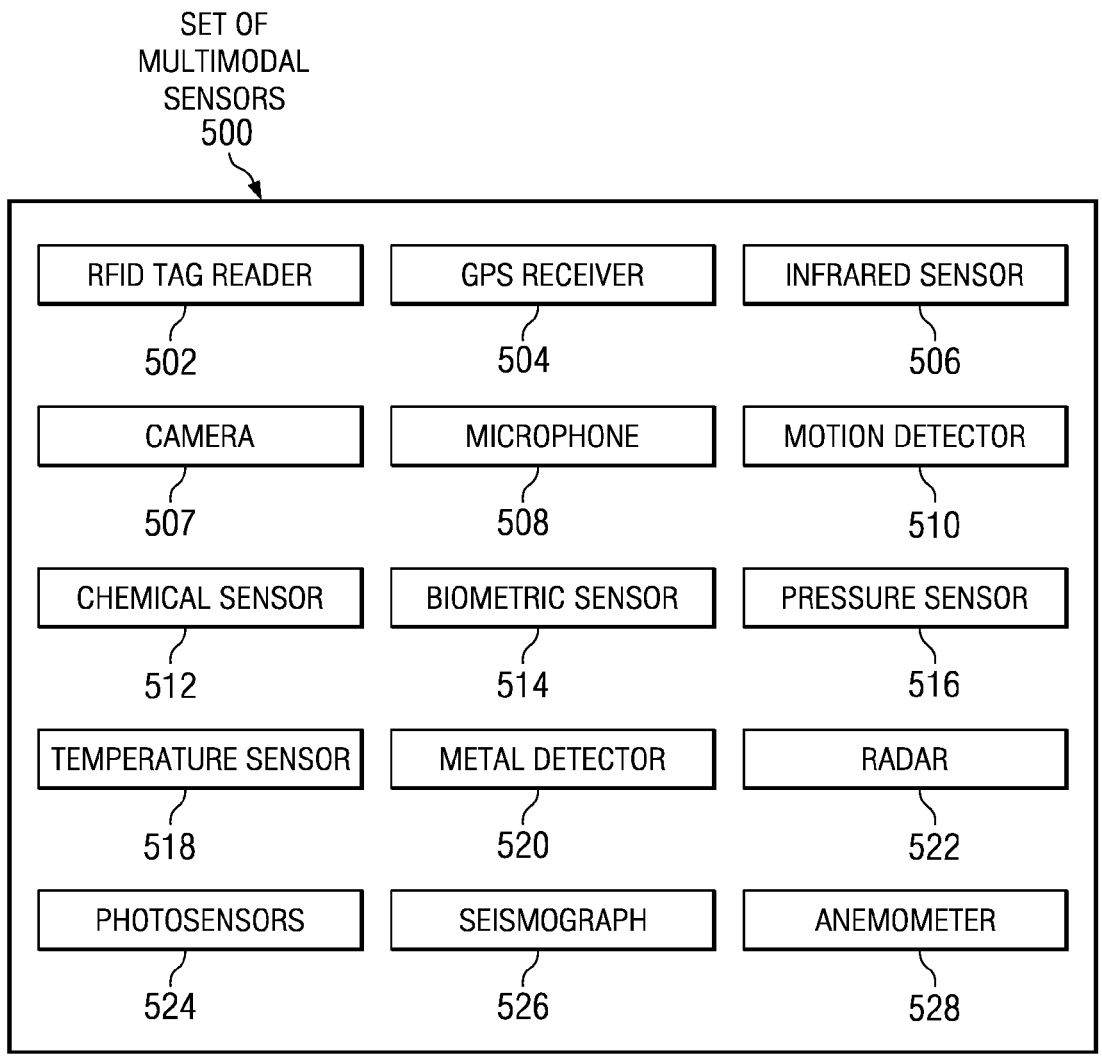
FIG. 5 is a block diagram of a set of multimodal sensors in accordance with an illustrative embodiment.

FIG. 5 is a block diagram of a set of multimodal sensors in accordance with an illustrative embodiment. Set of multimodal sensors 500 is a set of one or more sensor and/or actuator devices for generating sensory data, such as set of multimodal sensors 118 in FIG. 1. Set of multimodal sensors 500 may include radio frequency identification (RFID) tag readers, such as RDID tag reader 502. RFID tag reader 502 is a device for receiving data from an active or passive radio frequency identification tag. The radio frequency identification tag may be associated with a product packaging, an object, an identification card, or any other item.

Global positioning system (GPS) receiver 504 is a device for receiving signals from global positioning system satellites to determine a position or location of a person or object. GPS receiver 504 may be located in an object, such as a car, a portable navigation system, a personal digital assistant (PDA), or any other type of object. Infrared sensor 506 is a thermographic camera, also referred to as a forward looking infrared, or an infrared camera, for generating images using infrared radiation. Infrared energy includes the radiation that is emitted by all objects as a function of the object's temperature. Typically, the higher the temperature emitted by an object, the more infrared radiation is emitted by the object. Infrared sensor 506 generates images showing the patterns of infrared radiation associated with heat emitted by people, animals, and/or objects. Infrared sensor 506 operates independently of the presence of visible light. Therefore, infrared sensor 506 can generate infrared images even in total darkness.

Camera 507 is a device for generating images using visible light. Camera 507 is any type of known or available device for capturing images and/or audio, such as, without limitation, an optical image capture device, an infrared imaging device, a spectral or multispectral device, a sonic device, or any other type of image producing device. For example, camera 507 may be implemented as, without limitation, a digital video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with camera 507 to assist in capturing the desired view. Camera 507 may be fixed in a particular orientation and configuration, or it may, along with any optical devices, be programmable in orientation, light sensitivity level, focus or other parameters. For example, in one embodiment, camera 507 is capable of rotating, tilting, changing orientation, and panning. In another embodiment, camera 507 is a robot camera or a mobile camera that is capable of moving and changing location, as well as tilting, panning, and changing orientation. Programming data may be provided via a computing device, such as server 104 in FIG. 1.

In this embodiment, camera 507 is located in a fixed location. However, camera 507 is capable of moving and/or rotating along one or more directions, such as up, down, left, right, and/or rotate about an axis of rotation to change a field of view of the camera without changing location of the camera. Camera 507 may also be capable of rotating about an axis to keep a person, animal, vehicle or other object in motion within the field of view of the camera. In other words, the camera may be capable of moving about an axis of rotation in order to keep a moving object within a viewing range of the camera lens.

Camera 507 captures images associated with cohorts within the field of view of camera 507. The cohort may be, without limitation, a person, an animal, a motorcycle, a boat, an aircraft, a cart, or any other type of object.

Camera 507 transmits the video data, including images of cohorts, to a video analysis system for processing into metadata, such as video analysis 310 in FIG. 3. The video data may also include images of identifying features of the object, such as, without limitation, a face of a human user, license plate, an identification badge, a vehicle identification number (VIN), or any other identifying markings or features of the object. An analytics server can then analyze the images to identify the object using license plate recognition analytics, facial recognition analytics, behavior analysis analytics, or other analytics to identify a particular object and/or distinguish one object from another object.

Microphone 508 is any type of known or available device for recording sounds, such as, without limitation, human voices, engine sounds, babies crying, or any other sounds. Motion detector 510 is any type of known or available motion detector device. Motion detector 510 may include, but is not limited to, a motion detector device using a photo-sensor, radar or microwave radio detector, or ultrasonic sound waves. Motion detector 507 may use ultrasonic sound waves transmits or emit ultrasonic sounds waves. Motion detector 507 detects or measures the ultrasonic sound waves that are reflected back to the motion detector. If a human, animal, or other object moves within the range of the ultrasonic sound waves generated by motion detector 507, motion detector 507 detects a change in the echo of sound waves reflected back. This change in the echo indicates the presence of a human, animal, or other object moving within the range of motion detector 507.

In one example, motion detector 507 uses radar or microwave radio to send out a burst of microwave radio energy and detect the same microwave radio waves when the radio waves are deflected back to motion detector 507. If a human, animal, or other object moves into the range of the microwave radio energy field generated by motion detector 507, the amount of energy reflected back to motion detector 507 is changed. Motion detector 507 identifies this change in reflected energy as an indication of the presence of a human, animal, or other object moving within the range of motion detector 507.

Motion detector 507 may use a photo-sensor. In this example, motion detector 507 detects motion by sending a beam of light across a space into a photo-sensor. The photo-sensor detects when a human, animal, or object breaks or interrupts the beam of light as the human, animal, or object by moves in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

Chemical sensor 512 is a device for detecting the presence of air borne chemicals, such as perfumes, after shave, scented shampoos, scented lotions, and other scents. Biometric sensor 514 is a device for detecting biometric data associated with a cohort. Biometric data includes identifying physiological biometric data, such as, but without limitation, retinal patterns of the eye, iris patterns, fingerprints, thumb prints, and voice prints. Biometric data may also include behavioral biometrics, such as blood pressure, heart rate, body temperature, changes in pupil dilation, or any other physiological changes. Thus, biometric sensor 512 may include a fingerprint scanner, a thumbprint scanner, a retinal eye scanner, an iris scanner, or any other type of biometric device.

Pressure sensor 516 is a device for detecting a change in weight or mass on the pressure sensor. Pressure sensor 516 may be a single pressure sensor or a set of two or more pressure sensors. For example, if pressure sensor 516 is imbedded in a sidewalk, Astroturf, or floor mat, pressure sensor 516 detects a change in weight or mass when a human customer or animal steps on the pressure sensor. Pressure sensor 516 may also detect when a human or animal cohort shifts its weight and/or steps off of pressure sensor 516. In another example, pressure sensor 516 is embedded in a parking lot, and pressure sensor 516 detects a weight and/or mass associated with a vehicle when the vehicle is in contact with pressure sensor 516. A vehicle may be in contact with pressure sensor 516 when the vehicle is driving over pressure sensor 516 and/or when a vehicle is parked on top of pressure sensor 516.

Temperature sensor 518 is a device for measuring temperature changes associated with a cohort. For example, temperature sensor 518 may detect the heat emitted by a car engine or the body heat associated with a person or an animal. Metal detector 520 is a device for detecting metal objects. Metal detector 520 may be implemented as any type of known or available metal detection device.

Radar 522, also referred to as radio detection and ranging, uses electromagnetic waves to identify the range, direction, and/or speed of moving objects, such as cars, aircraft, and ships. Radar 522 transmits radio waves toward a target object. The target object may be a member of a cohort group, such as a car, or other object. The radio waves that are reflected back by the target object are detected by Radar 522 and used to measure the speed of the target object. Radar 522 may also include laser radar, also referred to as lidar, ladar, Airborne Laser Swath Mapping (ALSM), and laser altimetry. Laser radar uses light instead of radio waves. Laser radar typically uses short wavelengths of the electromagnetic spectrum, such as ultraviolet and near infrared.

Photosensors 524 is a device for detecting light waves, such as visible light. Seismograph 526 is a device for measuring seismic activity. Anemometer 528 is a device for measuring wind speed.

The sensors and actuators in set of multimodal sensors 500 include a transmission device that permits the sensors and actuators to transmit information between the multimodal sensors. In other words, one multimodal sensor can transmit information to another multimodal sensor in set of multimodal sensors. In addition, each multimodal sensor uses the transmitter to transmit sensor data to a software component for processing of the sensory data, such as sensory data processing 308 in FIG. 3.

Figure 6:
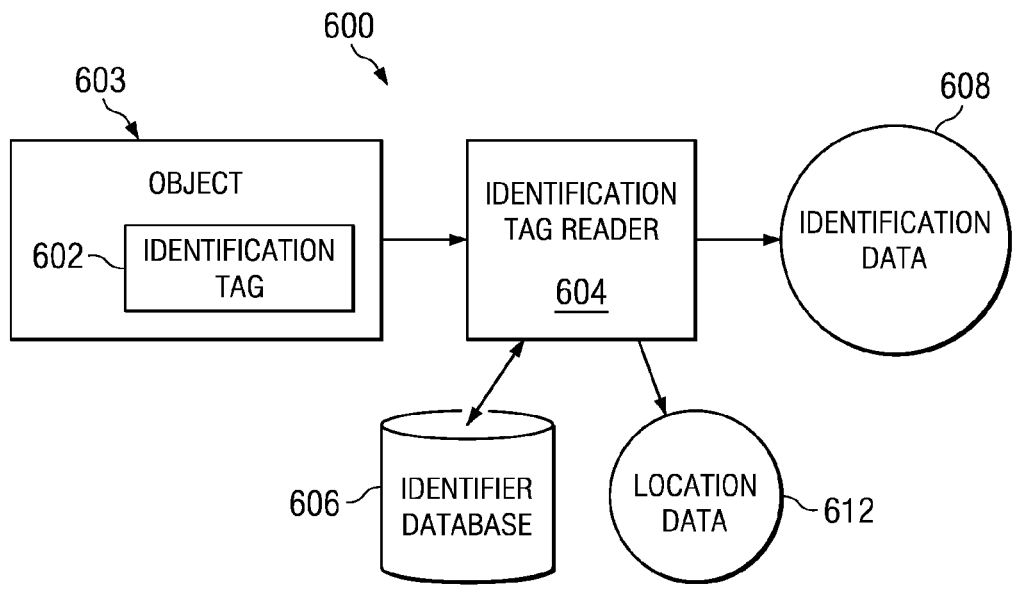
FIG. 6 is a block diagram of a radio frequency identification tag reader for gathering data associated with one or more cohorts is shown in accordance with an illustrative embodiment.

Turning now to FIG. 6, a block diagram of a radio frequency identification tag reader for gathering data associated with one or more cohorts is shown in accordance with an illustrative embodiment. Set of multimodal sensors 600 is a set of multimodal sensors that includes identification tag reader 604.

Object 603 is any type of object, such as packaging, an item of clothing, a book, or any other object. Identification tag 603 associated with object 603 is a tag for providing information regarding object 603 to identification tag reader 604. In this example, identification tag 602 is a radio frequency identification tag. A radio frequency identification tag includes read-only identification tags and read-write identification tags. A read-only identification tag is a tag that generates a signal in response to receiving an interrogate signal from an item identifier. A read-only identification tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes.

In this example, identification tag reader 604 provides identification data 608, and/or location data 612 to a computing device for processing by sensory data processing software, such as sensory data processing 308 in FIG. 3. Identification data 608 may include data regarding the product name, manufacturer name, product description, the regular price, sale price, product weight, tare weight and/or other information describing object 603.

Location data 612 is data regarding a location of object 603. Identifier database 606 is a database for storing any information that may be needed by identification tag reader 604 to read identification tag 602. For example, if identification tag 602 is a radio frequency identification tag, identification tag will provide a machine readable identification code in response to a query from identification tag reader 604. In this case, identifier database 606 stores description pairs that associate the machine readable codes produced by identification tags with human readable descriptors. For example, a description pair for the machine readable identification code "10101010111111" associated with identification tag 602 would be paired with a human readable item description of object 603, such as "orange juice." An item description is a human understandable description of an item. Human understandable descriptions are for example, text, audio, graphic, or other representations suited for display or audible output.

Figure 7:
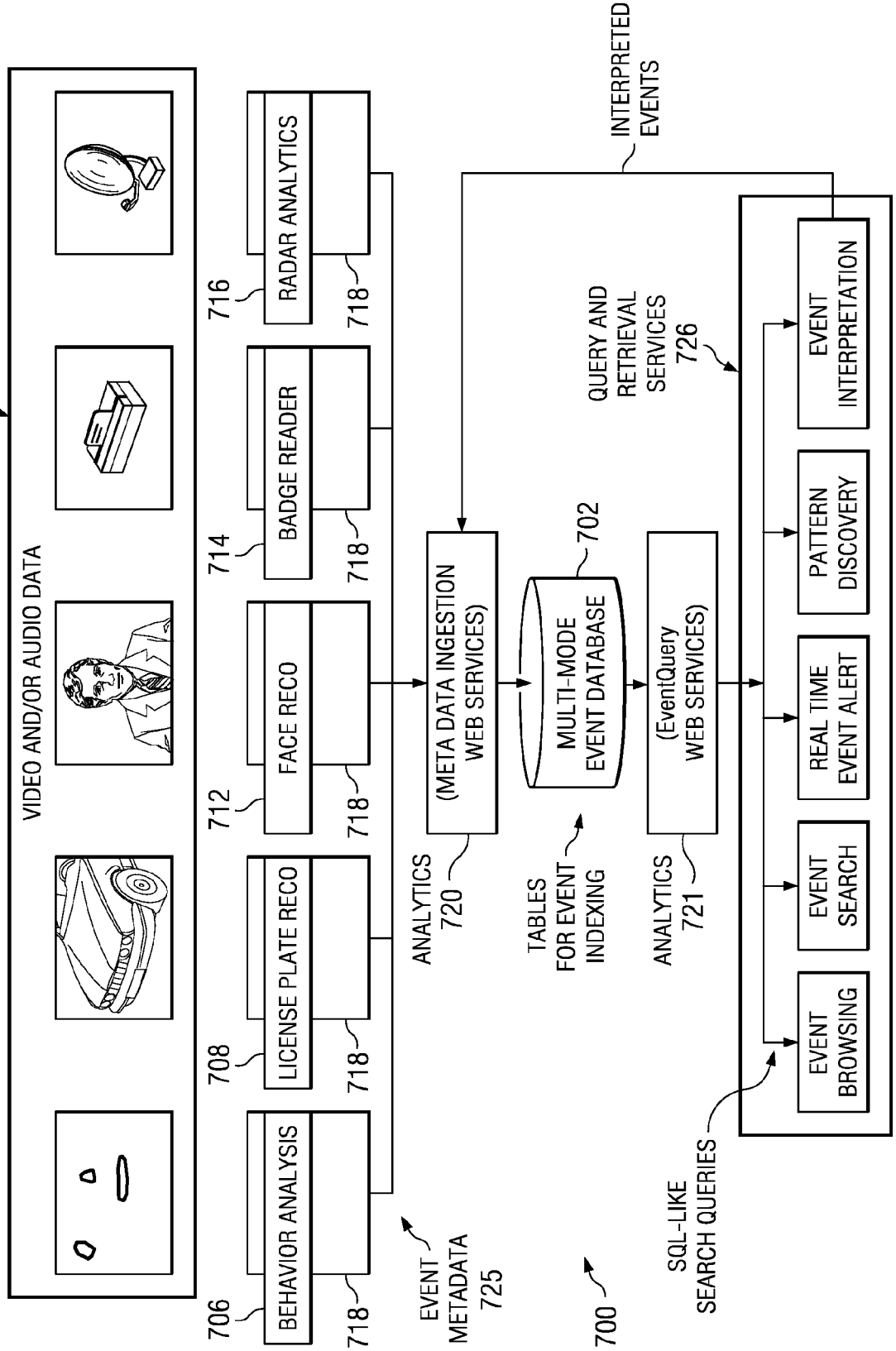
FIG. 7 is a block diagram of a video analysis system in accordance with an illustrative embodiment.

FIG. 7 is a block diagram of a video analysis system in accordance with an illustrative embodiment. Video analysis system 700 is software architecture for generating metadata describing images captured by a set of video cameras, such as video analysis 311 in FIG. 3. Video analysis system 700 may be implemented using any known or available software for image analytics, facial recognition, license plate recognition, and sound analysis. In this example, video analysis system 700 is implemented as IBM® smart surveillance system (S3) software.

Video analysis system 700 utilizes computer vision and pattern recognition technologies, as well as video analytics, such as video analysis 311 in FIG. 3, to analyze video images captured by one or more situated cameras and microphones. The analysis of the video data generates events of interest in the environment. For example, an event of interest associated with a cohort at a departure drop off area in an airport includes the position and location of cars, the position and location of passengers, and the position and location of other moving objects. As video analysis technologies have matured, they have typically been deployed as isolated applications which provide a particular set of functionalities.

Video analysis system 700 includes video analytics software for analyzing video images captured by a camera and/or audio captured by an audio device associated with the camera. The video analytics engine includes software for analyzing video and/or audio data 704. In this example, the video analytics engine in video analysis system 700 processes video and/or audio data 704 associated with one or more objects into data and metadata.

Video and/or audio data 704 is data captured by the set of cameras. Video and/or audio data 704 may be a sound file, a media file, a moving video file, a still picture, a set of still pictures, or any other form of image data and/or audio data. Video and/or audio data 704 may also be referred to as detection data. Video and/or audio data 704 may include images of a person's face, an image of a part or portion of a customer's car, an image of a license plate on a car, and/or one or more images showing a person's behavior. An image showing a customer's behavior or appearance may show a customer wearing a long coat on a hot day, a customer walking with two small children which may be the customer's children or grandchildren, a customer moving in a hurried or leisurely manner, or any other type of behavior or appearance attributes of a customer, the customer's companions, or the customer's vehicle.

In this example, video analytics engine 700 architecture is adapted to satisfy two principles. 1) Openness: The system permits integration of both analysis and retrieval software made by third parties. In one embodiment, the system is designed using approved standards and commercial off-the-shelf (COTS) components.

2) Extensibility: The system should have internal structures and interfaces that will permit for the functionality of the system to be extended over a period of time.

The architecture enables the use of multiple independently developed event analysis technologies in a common framework. The events from all these technologies are cross indexed into a common repository or a multi-mode event database 702 allowing for correlation across multiple audio/video capture devices and event types.

Video analysis system 700 includes the following illustrative analytical technologies integrated into a single system to generate metadata describing one or more objects in an area of interest based on video data from a set of cameras. The analytical technologies are technologies associated with video analytics. In this example, the video analytics technologies comprise, without limitation, behavior analysis technology 706, license plate recognition 708, face detection/recognition technology 712, badge reader technology 714, and radar analytic technology 716.

Behavior analysis technology 706 tracks moving objects and classifies the objects into a number of predefined categories by analyzing metadata describing images captured by the cameras. As used herein, an object may be a human, an object, a container, a cart, a bicycle, a motorcycle, a car, or an animal, such as, without limitation, a dog. Behavior analysis technology 706 may be used to analyze images captured by cameras deployed at various locations, such as, without limitation, overlooking a roadway, a parking lot, a perimeter, or inside a facility.

License plate recognition technology 708 may be utilized to analyze images captured by cameras deployed at the entrance to a facility, in a parking lot, on the side of a roadway or freeway, or at an intersection. License plate recognition technology 708 catalogs a license plate of each vehicle moving within a range of two or more video cameras associated with video analysis system 700. For example, license plate recognition technology 708 is utilized to identify a license plate number on license plate.

Face detection/recognition technology 712 is software for identifying a human based on an analysis of one or more images of the human's face. Face detection/recognition technology 712 may be utilized to analyze images of objects captured by cameras deployed at entryways, or any other location, to capture and recognize faces.

Badge reader technology 714 may be employed to read badges. The information associated with an object obtained from the badges is used in addition to video data associated with the object to identify an object and/or a direction, velocity, and/or acceleration of the object. Events from access control technologies can also be integrated into video analysis system 700.

The data gathered from behavior analysis technology 707, license plate recognition technology 708, face detection/recognition technology 712, badge reader technology 714, radar analytics technology 716, and any other video/audio data received from a camera or other video/audio capture device is received by video analysis system 700 for processing into metadata 725. Event metadata 725 is metadata describing one or more objects in an area of interest.

The events from all the above analysis technologies are cross-indexed into a single repository, such as multi-mode database 702. In such a repository, a simple time range query across the modalities will extract license plate information, vehicle appearance information, badge information, object location information, object position information, vehicle make, model, year and/or color, and face appearance information. This permits video analysis software to easily correlate these attributes. The architecture of video analysis system 700 also includes one or more analytics engines 718, which house event analysis technologies.

Video analysis system 700 further includes middleware for large scale analysis, such as metadata ingestion web services (analytics) 720 and web services analytics (analytics) 721, which provides infrastructure for indexing, retrieving, and managing event metadata 725.

In this example, video and/or audio data 704 is received from a variety of audio/video capture devices, such as set of multimodal sensors 500 in FIG. 5. Video and/or audio data 704 is processed in analytics engine 718.

Each analytics engine 718 can generate real-time alerts and generic event metadata. The metadata generated by analytics engine 718 may be represented using extensible markup language (XML). The XML documents include a set of fields which are common to all engines and others which are specific to the particular type of analysis being performed by analytics engine 718. In this example, the metadata generated by analytics 720. This may be accomplished via the use of, for example, web services data ingest application program interfaces (APIs) provided by analytics 720. The XML metadata is received by analytics 720 and indexed into predefined tables in multi-mode event database 702. This may be accomplished using, for example, and without limitation, the DB2™ XML extender, if an IBM® DB2™ database is employed. This permits for fast searching using primary keys. Analytics 721 provides a number of query and retrieval services based on the types of metadata available in the database.

Retrieval services 726 may include, for example, event browsing, event search, real time event alert, or pattern discovery event interpretation. Each event has a reference to the original media resource, such as, without limitation, a link to the video file. This allows the user to view the video associated with a retrieved event.

Video analysis system 700 provides an open and extensible architecture for dynamic video analysis in real time without human intervention. Analytics engines 718 preferably provide a plug and play framework for video analytics. The event metadata generated by analytics engines 718 is sent to multi-mode event database 702 in any type of programming language files, such as, without limitation, extensible markup language (XML) files. Web services API's in analytics 720 permit for easy integration and extensibility of the metadata. Various applications, such as, without limitation, event browsing, real time alerts, etc. may use structure query language (SQL) or similar query language through web services interfaces to access the event metadata from multi-mode event database 702.

Analytics engine 718 may be implemented as a C++ based framework for performing real-time event analysis. Analytics engine 718 is capable of supporting a variety of video/image analysis technologies and other types of sensor analysis technologies. Smart analytic engine 718 provides at least the following support functionalities for the core analysis components. The support functionalities are provided to programmers or users through a plurality of interfaces employed by analytics engine 718. These interfaces are illustratively described below.

In one example, standard plug-in interfaces may be provided. Any event analysis component which complies with the interfaces defined by analytics engine 718 can be plugged into analytics engine 718. The definitions include standard ways of passing data into the analysis components and standard ways of getting the results from the analysis components. Extensible metadata interfaces are provided. Analytics engine 718 provides metadata extensibility.

For example, consider a behavior analysis application which uses video capture and image analysis technology. Assume that the default metadata generated by this component is object trajectory and object size. The object may be a person, an animal, a plant, an insect, as well as an inanimate object. If the designer now wishes to add color of the object into the metadata, analytics engine 718 enables this by providing a way to extend the creation of the appropriate structures for transmission to the backend system 720. The structures may be, without limitation, extensible markup language (XML) structures or structures in any other programming language.

Analytics engine 718 provides standard ways of accessing event metadata in memory and standardized ways of generating and transmitting alerts to the backend system 720. In many applications, users will need the use of multiple basic real-time alerts in a spatio-temporal sequence to compose an event that is relevant in the user's application context. Analytics engine 718 provides a simple mechanism for composing compound alerts via compound alert interfaces. In many applications, the real-time event metadata and alerts are used to actuate alarms, visualize positions of objects on an integrated display, and control cameras to get better surveillance data. Analytics engine 718 provides developers with an easy way to plug-in actuation modules which can be driven from both the basic event metadata and by user-defined alerts using real-time actuation interfaces.

Using database communication interfaces, analytics engine 718 also hides the complexity of transmitting information from the analysis engines to multi-mode event database 702 by providing simple calls to initiate the transfer of information.

Analytics 720 and 721 may include, without limitation, a J2EE™ frame work built around IBM's DB2™ and IBM WebSphere™ application server platforms. Analytics 720 supports the indexing and retrieval of spatio-temporal event metadata. Analytics 720 also provides analysis engines with the following support functionalities via standard web services interfaces, such as, without limitation, extensible markup language (XML) documents.

Analytics 720 and 721 provide metadata ingestion services. These are web services calls which allow an engine to ingest events into analytics 720 and 721 system. There are two categories of ingestion services: 1) Index Ingestion Services: This permits for the ingestion of metadata that is searchable through SQL like queries. The metadata ingested through this service is indexed into tables which permit content based searches, such as provided by analytics 720. 2) Event Ingestion Services: This permits for the ingestion of events detected in analytics engine 718, such as provided by analytics 721. For example, a loitering alert that is detected can be transmitted to the backend along with several parameters of the alert. These events can also be retrieved by the user but only by the limited set of attributes provided by the event parameters.

Analytics 720 and/or 721 provide schema management services. Schema management services are web services which permit a developer to manage their own metadata schema. A developer can create a new schema or extend the base middleware for large scale analysis schema to accommodate the metadata produced by their analytical engine. In addition, system management services are provided by analytics 720 and/or 721.

The schema management services of analytics 720 and 721 provide the ability to add a new type of analytics to enhance situation awareness through cross correlation. A marketing model for a monitored retail marketing environment is dynamic and can change over time. For example, marketing strategies to sell soft drinks may be very different in December than in mid-summer. Thus, it is important to permit video analysis system 700 to add new types of analytics and cross correlate the existing analytics with the new analytics. To add/register a new type sensor and/or analytics to increase situation awareness, a developer can develop new analytics and plug them into smart analysis engine 718 and employ middleware for large scale analysis schema management service to register new intelligent tags generated by the new analytics engine analytics. After the registration process, the data generated by the new analytics can become immediately available for cross correlating with existing index data.

System management services provide a number of facilities needed to manage video analysis system 700 including: 1) Camera Management Services: These services include the functions of adding or deleting a camera from a MILS system, adding or deleting a map from a MILS system, associating a camera with a specific location on a map, adding or deleting views associated with a camera, assigning a camera to a specific middleware system server and a variety of other functionality needed to manage the system. 2) Engine Management Services: These services include functions for starting and stopping an engine associated with a camera, configuring an engine associated with a camera, setting alerts on an engine and other associated functionality. 3) User Management Services: These services include adding and deleting users to a system, associating selected cameras to a viewer, associating selected search and event viewing capacities to a user and associating video viewing privilege to a user. 4) Content Based Search Services: These services permit a user to search through an event archive using a plurality of types of queries.

For the content based search services (4), the types of queries may include: A) Search by time retrieves all events from event metadata 725 that occurred during a specified time interval. B) Search by object presence retrieves the last 100 events from a live system. C) Search by object size retrieves events where the maximum object size matches the specified range. D) Search by object type retrieves all objects of a specified type. E) Search by object speed retrieves all objects moving within a specified velocity range. F) Search by object color retrieves all objects within a specified color range. G) Search by object location retrieves all objects within a specified bounding box in a camera view. H) Search by activity duration retrieves all events from event metadata 725 with durations within the specified range. I) Composite Search combines one or more of the above capabilities. Other system management services may also be employed.

Figure 8:
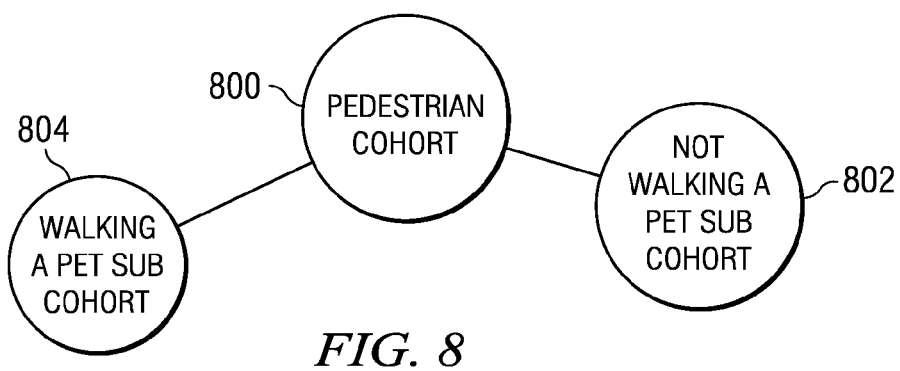
FIG. 8 is a block diagram of cohort groups in accordance with an illustrative embodiment.

Referring now to FIG. 8, a block diagram of cohort groups is shown in accordance with an illustrative embodiment. Pedestrian cohort 800 is a cohort of pedestrians walking in a given area. Pedestrian cohort 800 includes sub-cohorts, such as not walking a pet sub-cohort 802 and walking pet sub-cohort 804. For example, if pedestrian cohort 800 is a cohort of pedestrians walking or running along a jogging trail, not walking a pet sub-cohort 802 may be a cohort of all the pedestrians that are not accompanied by a dog or other pet. Walking a pet sub-cohort 804 may include all the members of pedestrian cohort 800 that are accompanied by a pet.

Figure 9:
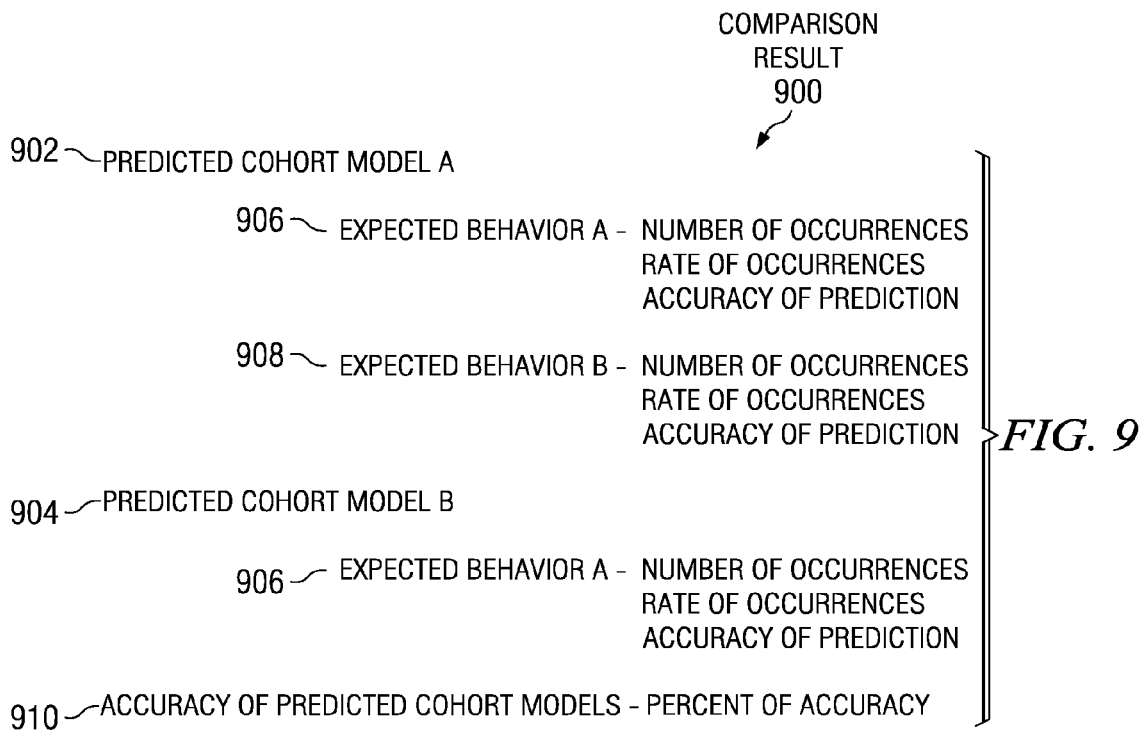
FIG. 9 is a block diagram of a comparison result in accordance with an illustrative embodiment.

FIG. 9 is a block diagram of a comparison result in accordance with an illustrative embodiment. Comparison result 900 is a result of performing a comparison between expected cohort behavior and actual cohort behavior identified using sensory data from a set of multimodal sensor devices, such as set of multimodal sensors 500 in FIG. 5. Predicted cohort model A 902 and predicted cohort model B 904 are models predicted expected cohort behaviors, such as set of predicted cohort models 318 in FIG. 3. Comparison result 900 provides comparison results for one or more expected behaviors, such as expected behavior A 906 and expected behavior B 908 in predicted cohort model A 902, as well as expected behavior A 906 in predicted cohort model B 904. Comparison model 900 provides comparison results indicating the validity of the predicted cohort models, such as, without limitation, the number of occurrences of actual cohort behaviors corresponding to an expected cohort behavior, a rate of the occurrences of the actual behaviors that correspond to the expected behavior, the accuracy of the prediction of the behaviors occurrence, and/or any other results associated with the validity of an expected behavior and/or a given predicted cohort model. Comparison result 900 may also provide an accuracy of one or more predicted cohort models, such as accuracy of predicted cohort models 910.

Figure 10:
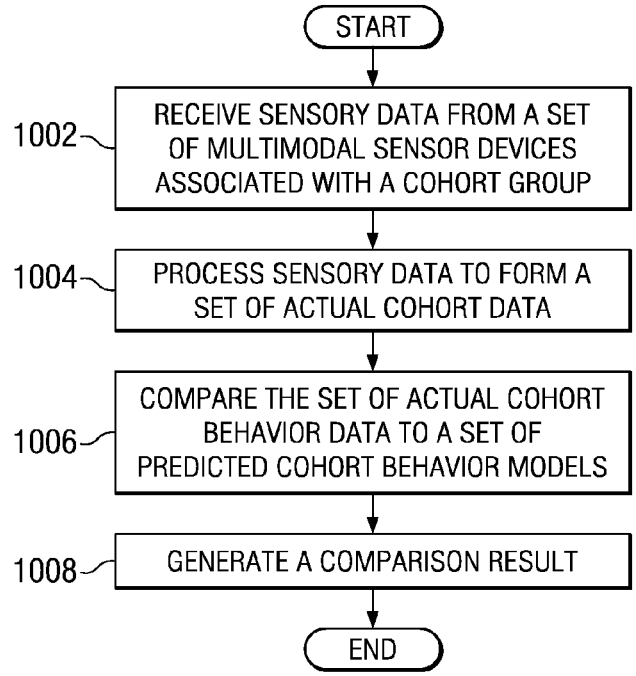
FIG. 10 is a flowchart illustrating a process for validating expected cohort behavior using sensory data from a set of multimodal sensors in accordance with an illustrative embodiment.

FIG. 10 is a flowchart illustrating a process for validating expected cohort behavior using sensory data from a set of multimodal sensors in accordance with an illustrative embodiment. The process in FIG. 10 may be implemented by a data processing system, such as data processing system 100 in FIG. 1. Steps 1002-1004 may be implemented by software for processing sensory data, such as sensory data processing 308 in FIG. 3. Steps 1006-1008 may be implemented by software for generating comparison results, such as cohort behavior comparison 320 in FIG. 3.

The process receives sensory data from a set of multimodal sensors devices associated with a cohort group, such as set of multimodal sensors 118 in FIG. 1 (step 1002). Sensory data is processed to form a set of actual cohort behavior data (step 1004). The set of actual cohort behavior data is compared to a set of predicted cohort behavior models (step 1006). A comparison result is then generated (step 1008) with the process terminating thereafter.

Given a set of events, a prediction can be made as to future expected events. For example, if sensory data 302 in FIG. 3 from radio frequency identification readers indicates that a person that is a member of a cohort group has five thousand Euros in his pocket, a predicted cohort model may be able to predict expected spending behaviors for the person. The predicted cohort model may predict that the member of the person will spend his money relative to a perceived value. Sensory data 302 may then be used to determine if the person actually spends his money as expected.

Thus, according to one embodiment of the present invention, a computer implemented method, apparatus, and computer usable program code is provided for validating expected cohort behavior. Sensory data associated with a cohort group is processed to form a set of actual cohort behavior data. Each member of the cohort group shares at least one common attribute. The set of actual cohort behavior data is compared to a set of predicted cohort behavior models. The set of actual cohort behavior data comprises information describing actual behavior by members of the cohort group. The set of predicted cohort behavior models comprises information describing an expected behavior of members of the cohort group. A comparison result is generated. The comparison result indicates an accuracy of the set of predicted cohort behavior models.

The comparison result permits a user to determine the accuracy of a given predicted cohort behavior model using data gathered by a plurality of multimodal sensors. In other words, data received from a variety of different sensor devices gathered information associated with members of one or more cohort groups. This data is analyzed to identify actual cohort behaviors. The embodiments generate a comparison report that permits a user to efficiently determine the accuracy of pre-generated, predicted, cohort behavior models.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for validating expected cohort behavior, the computer implemented method comprising:
   processing sensory data associated with a cohort group to form a set of actual cohort behavior data, wherein each member of the cohort group shares at least one common attribute;
   comparing the set of actual cohort behavior data to a set of predicted cohort behavior models, wherein the set of actual cohort behavior data comprises information describing actual behavior by members of the cohort group and wherein the set of predicted cohort behavior models comprises information describing an expected behavior of members of the cohort group; and
   generating a comparison result, wherein the comparison result indicates an accuracy of the set of predicted cohort behavior models.

2. The computer implemented method of claim 1 wherein the comparison result indicates an accuracy of a given predicted cohort behavior model in the set of predicted cohort behavior models.

3. The computer implemented method of claim 1 wherein the comparison result indicates a number of times a given expected behavior in a single predicted cohort data model corresponds with a given actual behavior of at least one member of the cohort group.

4. The computer implemented method of claim 1 wherein the comparison result indicates a rate of occurrence of each expected behavior in a single predicted cohort data model corresponding with an actual behavior of at least one member of the cohort group.

5. The computer implemented method of claim 1 wherein the comparison result indicates a number of times each expected behavior corresponds with the actual behavior of the members of a set of cohort groups.

6. The computer implemented method of claim 1 wherein processing the sensory data further comprises:
   collecting sensory data from a plurality of sensors in a set of multimodal sensors to form aggregated sensory data;
   parsing the sensory data to form events;
   categorizing the events in accordance with a type of the event; and
   processing the events to identify actual behaviors associated with members of cohort groups to form the set of actual cohort behavior data.

7. The computer implemented method of claim 1 further comprising:
   identifying a predicted cohort behavior model associated with the cohort group;
   parsing the predicted cohort behavior model to identify expected behaviors associated with the members of the cohort group; and
   comparing the actual behaviors associated with members of the cohort group to the expected behaviors; and
   responsive to a correlation between the actual behaviors and the expected behaviors, identifying a number of occurrences of the actual behaviors corresponding to a given expected behavior.

8. The computer implemented method of claim 1 wherein the set of multimodal sensors comprises at least one of a set of global positioning satellite receivers, a set of infrared sensors, a set of microphones, a set of motion detectors, a set of chemical sensors, a set of biometric sensors, a set of pressure sensors, a set of temperature sensors, a set of metal detectors, a set of radar detectors, a set of photosensors, a set of seismographs, and a set of anemometers.

9. The computer implemented method of claim 1 wherein the set of multimodal sensors comprises a set of digital video cameras, wherein the set of digital video cameras captures a stream of video data associated with the cohort group, and wherein the stream of video data is transmitted to a central data processing system in real time as the stream of video data is generated, and further comprising:
   analyzing the stream of video data by a video analytics engine associated with the central data processing system to generate video metadata describing the members of the cohort group and objects in the stream of video data; and
   identifying actual behaviors of the members of the cohort group using the video metadata.

10. The computer implemented method of claim 1 wherein the set of multimodal sensors comprises a set of radio frequency identification tag readers, wherein the set of radio frequency identification tag readers receives information from radio frequency identification tags.

11. A computer program product for validating expected cohort behavior, the computer program product comprising:
    a computer readable medium;
    program code stored on the computer-readable medium for processing sensory data associated with a cohort group to form a set of actual cohort behavior data, wherein each member of the cohort group shares at least one common attribute;
    program code stored on the computer-readable medium for comparing the set of actual cohort behavior data to a set of predicted cohort behavior models, wherein the set of actual cohort behavior data comprises information describing actual behavior by members of the cohort group and wherein the set of predicted cohort behavior models comprises information describing an expected behavior of members of the cohort group; and
    program code stored on the computer-readable medium for generating a comparison result, wherein the comparison result indicates an accuracy of the set of predicted cohort behavior models.

12. The computer program product of claim 11 wherein the comparison result indicates an accuracy of a given predicted cohort behavior model in the set of predicted cohort behavior models.

13. The computer program product of claim 11 further comprising:
    program code stored on the computer-readable medium for collecting sensory data from a plurality of sensors in a set of multimodal sensors to form aggregated sensory data;
    program code stored on the computer-readable medium for parsing the sensory data to form events;

program code stored on the computer-readable medium for categorizing the events in accordance with a type of the event; and program code stored on the computer readable-medium for processing the events to identify actual behaviors associated with members of cohort groups to form the set of actual cohort behavior data.

14. The computer program product of claim 11 further comprising:
program code stored on the computer-readable medium for identifying a predicted cohort behavior model associated with the cohort group;
program code stored on the computer-readable medium for parsing the predicted cohort behavior model to identify expected behaviors associated with the members of the cohort group; and
program code stored on the computer-readable medium for comparing the actual behaviors associated with members of the cohort group to the expected behaviors; and
program code stored on the computer-readable medium for identifying a number of occurrences of the actual behaviors corresponding to a given expected behavior in response to a correlation between the actual behaviors and the expected behaviors.

15. The computer program product of claim 11 wherein the set of multimodal sensors comprises a set of digital video cameras, wherein the set of digital video cameras captures a stream of video data associated with the cohort group, and wherein the stream of video data is transmitted to a central data processing system in real time as the stream of video data is generated, and further comprising:
program code stored on the computer-readable medium for analyzing the stream of video data by a video analytics engine associated with the central data processing system to generate video metadata describing the members of the cohort group and objects in the stream of video data; and
program code stored on the computer-readable medium for identifying actual behaviors of the members of the cohort group using the video metadata.

16. The computer program product of claim 11 wherein the set of multimodal sensors comprises a set of radio frequency identification tag readers, wherein the set of radio frequency identification tag readers receives information from radio frequency identification tags.

17. An apparatus comprising:
a bus system;
a communications system coupled to the bus system;
a memory connected to the bus system, wherein the memory includes computer usable program code; and
a processing unit coupled to the bus system, wherein the processing unit executes the computer-usable program code to process sensory data associated with a cohort group to form a set of actual cohort behavior data, wherein each member of the cohort group shares at least one common attribute; compare the set of actual cohort behavior data to a set of predicted cohort behavior models, wherein the set of actual cohort behavior data comprises information describing actual behavior by members of the cohort group and wherein the set of predicted cohort behavior models comprises information describing an expected behavior of members of the cohort group; and generate a comparison result, wherein the comparison result indicates an accuracy of the set of predicted cohort behavior models.

18. The apparatus of claim 17 wherein the comparison result indicates an accuracy of a given predicted cohort behavior model in the set of predicted cohort behavior models.

19. The apparatus of claim 17 wherein the processor unit further executes the computer-usable program code to collect sensory data from a plurality of sensors in a set of multimodal sensors to form aggregated sensory data; parse the sensory data to form events; categorize the events in accordance with a type of the event; and process the events to identify actual behaviors associated with members of cohort groups to form the set of actual cohort behavior data.

20. The apparatus of claim 17 wherein the processor unit further executes the computer-usable program code to identify a predicted cohort behavior model associated with the cohort group; parse the predicted cohort behavior model to identify expected behaviors associated with the members of the cohort group; compare the actual behaviors associated with members of the cohort group to the expected behaviors; and identify a number of occurrences of the actual behaviors corresponding to a given expected behavior in response to a correlation between the actual behaviors and the expected behaviors.

21. A data processing system for validating expected cohort behavior comprising:
a sensory data processing engine, wherein the sensory data processing engine receives sensory data associated with a cohort group from a plurality of multimodal sensor devices and wherein the sensory data processing engine processes the sensory data to form a set of actual cohort behavior data;
a cohort behavior comparison component, wherein the cohort behavior comparison component compares the set of actual cohort behavior data to a set of predicted cohort behavior models, wherein the set of actual cohort behavior data comprises information describing actual behavior by members of the cohort group and wherein the set of predicted cohort behavior models comprises information describing an expected behavior of members of the cohort group, and wherein the cohort behavior comparison component generates a comparison result, wherein the comparison result indicates an accuracy of the set of predicted cohort behavior models.

22. The data processing system of claim 21 further comprising:
the set of multimodal sensors, wherein the set of multimodal sensors comprises a set of digital video cameras, and wherein the set of multimodal sensors transmits a stream of video data associated with the cohort group to the sensory data processing engine in real time as the stream of video data is captured by the set of digital video cameras to form the sensory data.

23. The data processing system of claim 21 further comprising:
the set of multimodal sensors, wherein the set of multimodal sensors comprises a set of radio frequency identification tag receivers.

24. The data processing system of claim 21 wherein the sensory data processing engine further comprises:
a video analysis system, wherein the video analysis system analyzes a stream of video data received from at least one digital video camera in the set of multimodal sensors, wherein the video analysis system generates metadata describing contents of the stream of video data, and wherein the sensory data processing engine identifies events associated with behavior of cohorts using the metadata.

25. The data processing system of claim 21 further comprising:
the set of multimodal sensors, wherein the set of multimodal sensors comprises at least one of a set of global positioning satellite receivers, a set of infrared sensors, a set of microphones, a set of motion detectors, a set of chemical sensors, a set of biometric sensors, a set of pressure sensors, a set of temperature sensors, a set of metal detectors, a set of radar detectors, a set of photosensors, a set of seismographs, and a set of anemometers.

* * * * *